Figure 1:
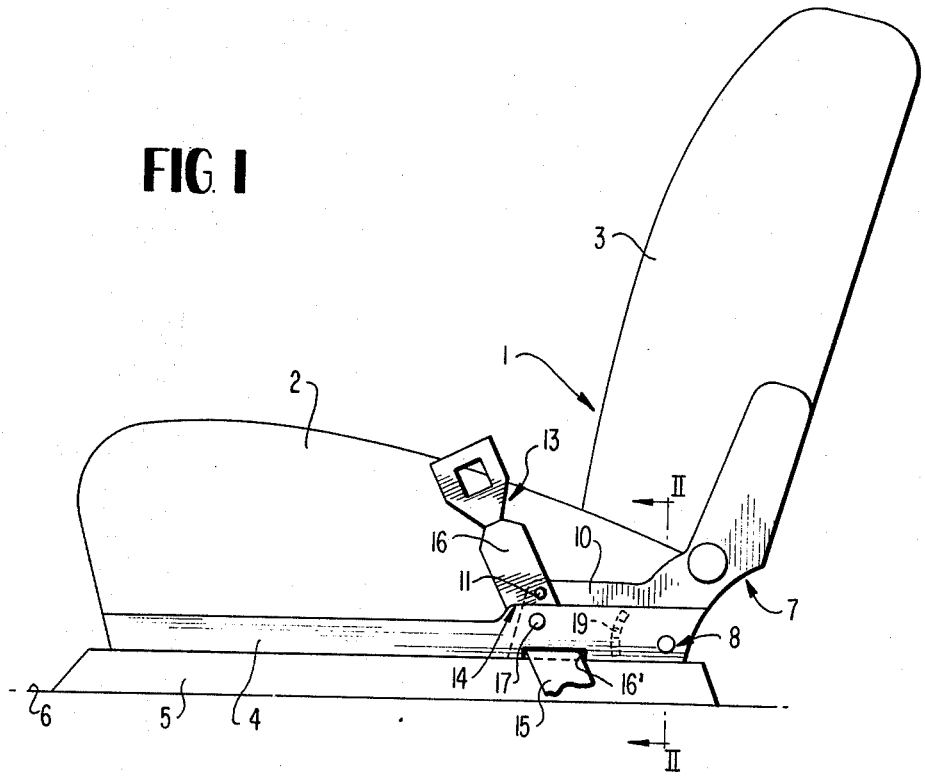

United States Patent [19]

Breitschwerdt

[11] 3,972,561
[45] Aug. 3, 1976

[54] RETAINING MECHANISM FOR THE PASSENGERS OF VEHICLES

[75] Inventor: Werner Breitschwerdt, Stuttgart, Germany

[73] Assignee: Daimler-Benz Aktiengesellschaft, Germany

[22] Filed: Oct. 3, 1974

[21] Appl. No.: 511,626

[30] Foreign Application Priority Data
Oct. 4, 1973    Germany............................ 2349829

[52] U.S. Cl................................. 297/216; 297/385
[51] Int. Cl.²......................................... B60R 21/10
[58] Field of Search ............ 297/216, 386, 385, 388

[56] References Cited
UNITED STATES PATENTS

| | | | |
|---|---|---|---|
| 2,227,717 | 1/1941 | Jones............................. | 297/216 X |
| 2,725,921 | 12/1955 | Markin............................. | 297/216 |
| 2,818,909 | 1/1958 | Burnett............................. | 297/216 |
| 3,438,674 | 4/1969 | Radke............................. | 297/386 |
| 3,563,498 | 2/1971 | Haile............................. | 297/386 X |
| 3,582,133 | 6/1971 | De Lavenne......................... | 297/216 |
| 3,734,562 | 5/1973 | Fourrey ............................. | 297/216 |
| 3,746,393 | 7/1973 | Andres............................. | 297/388 |
| 3,761,127 | 9/1973 | Giege............................. | 297/216 |
| 3,858,930 | 1/1975 | Calandra............................. | 297/216 |

Primary Examiner—Roy D. Frazier
Assistant Examiner—William E. Lyddane
Attorney, Agent, or Firm—Craig & Antonelli

[57] ABSTRACT

A retention mechanism for the passengers of motor vehicles which is able to deflect in the load direction when reaching a predetermined load, preferably under energy absorption; the deflection movement of the retention mechanism is thereby transmitted to the seat backrest in the sense that the coordinated seat backrest yields in the backward direction.

14 Claims, 2 Drawing Figures

U.S. Patent  Aug. 3, 1976  3,972,561

RETAINING MECHANISM FOR THE PASSENGERS OF VEHICLES

The present invention relates to a retaining mechanism for the passengers of vehicles, especially of motor vehicles, which upon reaching a predetermined load, deflects in the load direction—preferably under energy absorption.

If, for example, in a passenger motor vehicle, the rear seats are occupied by passengers or are loaded with objects, then the same are thrown against the backrests of the driver or front seats in case of a vehicle front end collision or impact and thereby force the front seats against the forward passengers moving forwardly under the action of a belt-force limiter. During this occurrence, dangerously high peak forces may act on the passengers for short periods of time which may lead readily to injuries.

It is the aim of the present invention to effectively prevent this danger source in a simple manner.

Consequently, a retention mechanism for the passengers of vehicles, especially of motor vehicles, is proposed which upon reaching a predetermined load, deflects in the load direction—preferably under energy absorption—, whereby means are provided according to the present invention, by means of which the deflection movement of the retention mechanism is transmitted onto the coordinated seat backrest in the sense of a giving way of the coordinated seat backrest.

In a preferred embodiment of the present invention, in which the retention mechanism consists of a safety belt system, the belt part adapted to be pulled out in case of load may be secured at the lower leg of a tiltably arranged backrest fitting.

A pull-out of the belt is made possible also in case of a strongly loaded backrest if the fastening of the belt part adapted to be pulled out at the lower leg portion takes place by a connection provided with an intentional breaking place.

A pivoting back of the backrest into its original position can be prevented in case of an impact of a detent mechanism is mounted at the lateral upwardly projecting leg portion of the seat frame within the pivot area of the lower leg portion of the backrest fitting, into which a pawl springily projecting from the lower leg portion is able to engage.

Accordingly to a further feature of the present invention, the belt part adapted to be pulled out may be supported by means of a bolt secured at the seat frame which, upon exceeding a predetermined belt force, tears open or splits the belt part under energy absorption.

It is of advantage if the belt part adapted to be pulled out is guided through a slot provided in the lateral upright leg portion of the seat frame.

Accordingly, it is an object of the present invention to provide a retention mechanism for the passengers of motor vehicles which avoids by simple means the aforementioned shortcomings and drawbacks encountered in the prior art.

Another object of the present invention resides in a retention mechanism for the passengers of vehicles which effectively eliminates the danger sources that may lead to dangerously high peak forces acting on the passengers in case of an impact of the vehicle.

A further object of the present invention resides in a retention mechanism for the passengers of motor vehicles which is simple in construction, involves relatively few parts and is highly effective for its intended purposes.

Another object of the present invention resides in a retention mechanism for the passengers of motor vehicles which protects the passengers in the front seats against the consequences of the impacts by rear seat passengers or objects placed into the rear seats of the vehicle which may be thrown against the backrest of the front seats in case of a vehicle impact.

Figure 2:
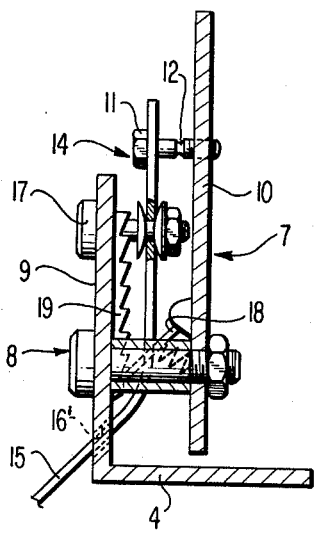

These and other objects, features and advantages of the present invention will become more apparent from the following description when taken in connection with the accompanying drawing which shows, for purposes of illustration only, one embodiment in accordance with the present invention, and wherein:

FIG. 1 is a somewhat schematic side elevational view of a vehicle seat equipped in accordance with the present invention; and FIG. 2 is a cross-sectional view, on an enlarged scale, taken along line II—II of FIG. 1.

Referring now to the drawing wherein like reference numerals are used throughout the two views to designate like parts, a vehicle seat generally designated by reference numeral 1 which is displaceable in the longitudinal direction in a conventional manner (not shown) includes a seat cushion 2 and a backrest 3. The vehicle seat 1 is received by a seat frame 4 which is supported at the vehicle floor 6, for example, by way of a bracket 5.

The backrest 3, whose inclination may be adjustable by conventional means, is provided on both sides with a backrest fitting generally designated by reference numeral 7 involving conventional hardware, which is secured each at the lateral upright leg portion 9 of the seat frame 2 by means of a pivotal connection generally designated by reference numeral 8 (FIG. 2). The lower leg portion 10 of one backrest fitting 7 is secured at a retention mechanism generally designated by reference numeral 13 by a connection 11 which includes an intended breaking place 12. The connection 11 represents a means generally designated by reference numeral 14 which operates in the illustrated embodiment purely mechanically and brings about that when pulling out the belt part 15 of the retention mechanism 13 constructed as belt system 16, the backrest 3 is pivoted back, i.e., in the clockwise direction as viewed in FIG. 1. The belt part 15 which is guided through a slot 16' in the lateral upright leg portion 9 of the seat frame 4, is supported at the seat frame 4 by way of a bolt 17. If the belt force in case of an accident reaches a predetermined value which is still barely tolerable for the user, then the belt part 15 is torn or split by the bolt 17 under energy absorption. The backrest 3 is pivoted back by way of the connection 11 and a pawl 18 which projects springily from the lower leg portion 10 of the backrest fitting 7, comes into successive engagement with teeth of a detent mechanism 19 which are arranged approximately along an arc. As a result thereof, during an impact, for example of a luggage piece against the backrest 3, a bracing and support thereof takes place. Simultaneously, a breakage of the connection 11 at its intended breaking place 12 takes place by the belt force which increases up to a predetermined value, whereupon a further pulling out of the belt can take place under energy absorption.

It is prevented by a mechansim (not shown) of any conventional construction which in the normal condition is operatively connected with the backrest fitting 7 and pulls the same downwardly at the lower leg portion, that in case of a rear end collision or impact the backrest 3 is displaced rearwardly. The not illustrated mechanism which may operate, for example, by means of a toggle spring system having a dead-center point, is so connected with the belt portion 15 that with the beginning of the pull-out of the belt, an unlocking or unlatching of the backrest fitting 7 takes place.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A retention mechanism for the passengers of vehicles having seats provided with a seat cushion and a backrest, wherein the retention mechanism yields upon reaching a predetermined load, including means for transmitting the yielding movement of the retention mechanism onto the associated backrest independently of the seat cushion so as to move the backrest in a direction opposite to the movement of the passenger associated with that backrest.

2. A retention mechanism according to claim 1, characterized in that the vehicle is a motor vehicle.

3. A retention mechanism according to claim 1, characterized in that the retention mechanism yields in the load direction upon reaching the predetermined load.

4. A retention mechanism according to claim 3, characterized in that the retention mechanism yields in the load direction upon reaching a predetermined load under energy absorption.

5. A retention mechanism according to claim 4, wherein the yielding movement transmittal means includes a safety belt system with a belt portion adapted to be pulled out in case of a load, characterized in that the belt portion adapted to be pulled out in case of a load is secured at the lower leg of a tiltably arranged backrest fitting means.

6. A retention mechanism according to claim 5, characterized in that the fastening of said belt portion at the lower leg portion takes place by a connecting means provided with an intentional breaking place.

7. A retention mechanism according to claim 6, with a seat frame means having a lateral upright leg portion, characterized in that a detent means is provided at the lateral upright leg portion of the seat frame means within the pivot area of the lower leg portion of the backrest fitting means, and a pawl which projects elastically from the lower leg portion of the backrest fitting means, operable to engage into said detent means.

8. A retention mechanism according to claim 7, characterized in that the belt portion adapted to be pulled out is supported by a bolt secured at the seat frame means, said bolt tearing open the belt portion under energy absorption when a predetermined belt force is exceeded.

9. A retention mechanism according to claim 8, characterized in that the belt portion adapted to be pulled out is guided through a slot in the lateral upright leg portion of the seat frame means.

10. A retention mechanism according to claim 1, wherein the yielding movement transmittal means includes a safety belt system with a belt portion adapted to be pulled out in case of a load, characterized in that the belt portion adapted to be pulled out in case of a load is secured at the lower leg of a tiltably arranged backrest fitting means.

11. A retention mechanism according to claim 10, characterized in that the fastening of said belt portion at the lower leg portion takes place by a connecting means provided with an intentional breaking place.

12. A retention mechanism according to claim 10, with a seat frame means having a lateral upright leg portion, characterized in that a detent means is provided at the lateral upright leg portion of the seat frame means within the pivot area of the lower leg portion of the backrest fitting means, and a pawl which projects elastically from the lower leg portion of the backrest fitting means, operable to engage into said detent means.

13. A retention mechanism according to claim 12, characterized in that the belt portion adapted to be pulled out is supported by a bolt secured at the seat frame means, said bolt tearing open the belt portion under energy absorption when a predetermined belt force is exceeded.

14. A retention mechanism according to claim 12, characterized in that the belt portion adapted to be pulled out is guided through a slot in the lateral upright leg portion of the seat frame means.

* * * * *